United States Patent
Kuretake (10) Patent No.: US 10,894,537 B2
(45) Date of Patent: Jan. 19, 2021

(54) SPEED CHANGE CONTROL SYSTEM FOR VEHICLE

(71) Applicant: TOYOTA JIDOSHA KABUSHIKI KAISHA, Toyota (JP)

(72) Inventor: Ken Kuretake, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/394,306

(22) Filed: Apr. 25, 2019

(65) Prior Publication Data
US 2019/0344779 A1 Nov. 14, 2019

(30) Foreign Application Priority Data
May 8, 2018 (JP) ................................ 2018-090111

(51) Int. Cl.
| | |
|---|---|
| *B60W 30/188* | (2012.01) |
| *B60W 20/00* | (2016.01) |
| *B60W 20/15* | (2016.01) |
| *B60W 20/13* | (2016.01) |
| *B60K 6/365* | (2007.10) |
| *B60W 30/14* | (2006.01) |

(52) U.S. Cl.
CPC .............. *B60W 20/15* (2016.01); *B60K 6/365* (2013.01); *B60W 20/13* (2016.01); *B60W 30/143* (2013.01); *B60W 30/188* (2013.01)

(58) Field of Classification Search
CPC .... B60W 20/15; B60W 20/13; B60W 30/143; B60W 30/188; B60K 6/365

USPC ..................................................... 180/65.285
See application file for complete search history.

(56) References Cited

U.S. PATENT DOCUMENTS

| | | | |
|---|---|---|---|
| 5,873,426 A | 2/1999 | Tabata et al. | |
| 9,481,371 B2 | 11/2016 | Park | |
| 9,493,154 B2* | 11/2016 | Park | B60W 10/115 |
| 10,077,823 B2* | 9/2018 | Ai | B60L 50/61 |
| 2009/0227417 A1 | 9/2009 | Imamura et al. | |
| 2014/0148985 A1 | 5/2014 | Sato et al. | |
| 2016/0107637 A1 | 4/2016 | Park et al. | |

FOREIGN PATENT DOCUMENTS

| | | |
|---|---|---|
| EP | 1738948 A1 | 1/2007 |
| JP | 2009-113670 A | 5/2009 |
| JP | 2009-214609 A | 9/2009 |
| JP | 2010-111191 A | 5/2010 |
| JP | 2012-126327 A | 7/2012 |
| KR | 101588760 B1 | 1/2016 |

* cited by examiner

*Primary Examiner* — John D Walters
(74) *Attorney, Agent, or Firm* — Oliff PLC (57) ABSTRACT

A speed change control system that suppress a change in a vehicle behavior, and prevents a reduction in an energy efficiency. The speed change control system is applied to a vehicle comprising: a transmission; a wheel connected to the transmission; a motor in which torque or speed is changed by changing a speed ratio of the transmission; and an electric storage device connected to the motor. A controller is configured to select a first mode if an SOC level of an electric storage device is lower than a predetermined level, and select a second mode if the SOC level of the electric storage device is equal to or higher than the predetermined level.

5 Claims, 7 Drawing Sheets

SPEED CHANGE CONTROL SYSTEM FOR VEHICLE

CROSS REFERENCE TO RELATED APPLICATIONS

The present disclosure claims the benefit of Japanese Patent Application No. 2018-090111 filed on May 8, 2018 with the Japanese Patent Office, the disclosure of which are incorporated herein by reference in its entirety.

BACKGROUND

Field of the Disclosure

Embodiments of the present disclosure relate to the art of a speed change control system for a vehicle comprising a motor as a prime mover and a transmission.

Discussion of the Related Art

US 2009/0227417 A1 describes a control apparatus for a hybrid vehicle comprising: a differential mechanism having a first rotary element connected to an engine, a second rotary element connected to a first motor, and a third rotary element connected to an output member; and a geared transmission connected to the third rotary element of the differential mechanism. The geared transmission comprises a plurality of clutches and brakes each of which is actuated by a hydraulic actuator. According to the teaching of US 2009/0227417 A1, a shift line defining gear stages of the transmission is altered in such a manner as to determine an execution of a shifting operation of the transmission when a response of the actuator is relatively slow due to a low temperature of oil.

According to the teaching of US 2009/0227417 A1, an engine speed may be adjusted in an optimally fuel efficient manner by executing a shifting operation by controlling the differential mechanism and the transmission in accordance with a required drive force and a vehicle speed. However, a change in a vehicle behavior will be caused at least slightly as a result of executing a shifting operation. For example, an engine speed will be changed by executing a shifting operation, and the driver would feel uncomfortable feeling if the shifting operation is executed frequently. Such change in the vehicle behavior resulting from execution of a shifting operation may also be caused in an electric vehicle in which only a motor is employed as a prime mover.

SUMMARY

Aspects of embodiments of the present disclosure have been conceived noting the foregoing technical problems, and it is therefore an object of the present disclosure to provide a speed change control system for a vehicle configured to suppress a change in a vehicle behavior resulting from execution of a speed change operation of a transmission, and to prevent a reduction in an energy efficiency which might otherwise be caused if the speed change operation is not executed.

The speed change control system according to the exemplary embodiment of the present disclosure is applied to a vehicle comprising: a transmission; a drive wheel that is connected to the transmission; a motor in which at least any one of a torque and a speed is changed by changing a speed ratio of the transmission; and an electric storage device that is connected to the motor. In order to achieve the above-explained objectives, according to the exemplary embodiment of the present disclosure, the speed change control system is provided with a controller that controls the transmission. Specifically, the controller is configured to: select a shifting mode of the transmission from a first mode in which a speed ratio of the transmission is changed in accordance with an operating condition of the vehicle, and a second mode in which the speed ratio of the transmission is fixed to a predetermined ratio; and select the first mode in a case that a state of charge level of the electric storage device is lower than a predetermined level, and select the second mode in a case that the state of charge level of the electric storage device is equal to or higher than the predetermined level.

In a non-limiting embodiment, the second mode may include a mode in which the speed ratio of the transmission is fixed to the predetermined ratio in a case that a speed of the vehicle is lower than a predetermined level, and the speed ratio of the transmission is changed in a case that the speed of the vehicle is equal to or higher than the predetermined level.

In a non-limiting embodiment, the controller may be further configured to: select the shifting mode of the transmission from a normal shifting mode in which the speed ratio of the transmission is controlled in accordance with a vehicle speed and a required drive force in such a manner that a system efficiency is optimized, and a seamless mode in which the speed ratio of the transmission is controlled in such a manner that a change in a behavior of the vehicle is reduced; the seamless mode includes the first mode and the second mode; and the first mode includes a mode in which at least any one of the speed ratios available in the normal shifting mode is inhibited.

In a non-limiting embodiment, the controller may be further configured to: calculate an increasing amount of an energy loss resulting from propelling the vehicle in the seamless mode; calculate a difference between an amount of regenerative energy by the motor in a case of maintaining the current speed ratio during deceleration of the vehicle, and an amount of regenerative energy by the motor in a case of changing the speed ratio of the transmission to increase the regenerative energy; allow execution of a speed change operation of the transmission during deceleration of the vehicle in a case that the difference between the regenerative energies is greater than the increasing amount of the energy loss; and inhibit execution of a speed change operation of the transmission during deceleration of the vehicle in a case that the difference between the regenerative energies is smaller than the increasing amount of the energy loss.

In a non-limiting embodiment, the controller may be further configured to set the speed ratio of the transmission to the ratio same as the normal shifting mode during deceleration of the vehicle, in the case that execution of a speed change operation of the transmission is allowed during deceleration of the vehicle.

In a non-limiting embodiment, the motor may be connected to an input side of the transmission.

In a non-limiting embodiment, the speed change control system may further comprise another prime mover that is connected to an input side of the transmission. In this case, the motor may be connected to a torque transmitting route between the transmission and the drive wheel.

Thus, according to the exemplary embodiment of the present disclosure, the first mode in which the speed ratio of the transmission is changed in accordance with an operating condition of the vehicle is selected in the case that a state of charge level of the electric storage device is lower than the predetermined level. According to the exemplary embodiment of the present disclosure, therefore, the energy efficiency will not be reduced excessively when the speed change operation is not executed. By contrast, the second mode in which the speed ratio of the transmission is fixed to the predetermined ratio is selected in the case that the state of charge level of the electric storage device is equal to or higher than the predetermined level. According to the exemplary embodiment of the present disclosure, therefore, a change in a behavior of the vehicle resulting from executing the speed change operation can be suppressed to reduce uncomfortable feeling of a passenger. That is, the speed change control system determines execution of the speed change operation depending on a state of charge level of the electric storage device. According to the exemplary embodiment of the present disclosure, therefore, the speed change operation can be executed while reducing a change in the behavior of the vehicle as well as preventing a reduction in the energy efficiency.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. The speed change control system according to the embodiment of the present disclosure may be applied to an electric vehicle EV in which a motor 1 having a generating function is employed as a prime mover. For example, a permanent magnet synchronous motor may be adopted as the motor 1, and the motor 1 is connected to an electric storage device 2 including a battery and a capacitor via an inverter and a converter (none of which are illustrated). The motor 1 may be operated as a motor to generate a drive torque by supplying electricity from the electric storage device 2 to the motor 1. The motor 1 may also be operated as a generator to generate a regenerative torque. In this case, electricity generated by the motor 1 is accumulated in the electric storage device 2.

A geared transmission (referred to as T/M in FIG. 1) 4 is connected to an output shaft 3 of the motor 1. A gear stage (or speed ratio) of the transmission 4 may be selected from a plurality of stages of different speed ratios by manipulating engagement devices including a clutch and a brake. In the vehicle EV shown in FIG. 1, a forward stage of the transmission 4 may be selected from the 1st stage to the 10th stage.

An output shaft 5 of the transmission 4 is connected to a pair of drive wheels 7 through a gear train including a differential gear unit 6. In the vehicle EV shown in FIG. 1, therefore, a speed ratio between the motor 1 and the drive wheel 7 can be changed arbitrarily by shifting the gear stage of the transmission 4. In other words, a torque and a speed of the motor 1 can be changed by shifting the gear stage of the transmission 4.

Figure 1:
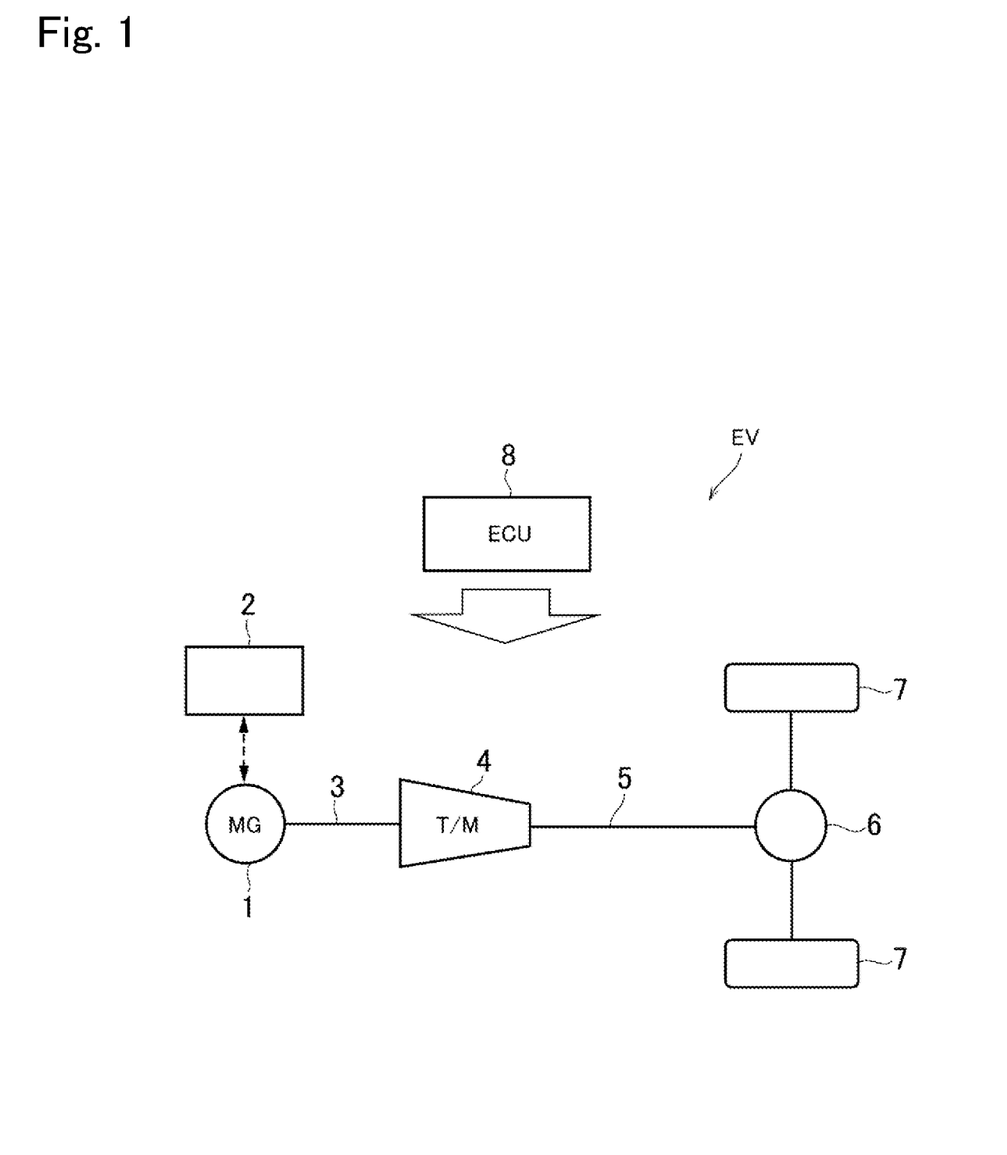
FIG. 1 is a schematic illustration showing one example of a structure of a vehicle to which the speed change control system according to the embodiment of the present disclosure is applied.

The vehicle EV is provided with an electronic control unit (to be abbreviated as the "ECU" hereinafter) 8 as a controller to control the motor 1 and the transmission 4. The ECU 8 is configured having a microcomputer as its main constituent, and detection signals from various sensors are sent to the ECU 8. The ECU 8 determines a target speed and a target torque of the motor 1 based on the incident signals and formulas as well as maps installed in the ECU 8, and determines a target stage of the transmission 4 based on the determined target speed and torque of the motor 1. For example, the ECU 8 receives detection signals of a vehicle speed, a speed of the motor 1, a depression of an accelerator pedal (not shown), a depression of a brake pedal (not shown), a state of charge level (to be abbreviated as "SOC" hereinafter) of the electric storage device 2, a temperature of the electric storage device 2, a temperature of the motor 1 and so on.

Figure 2:
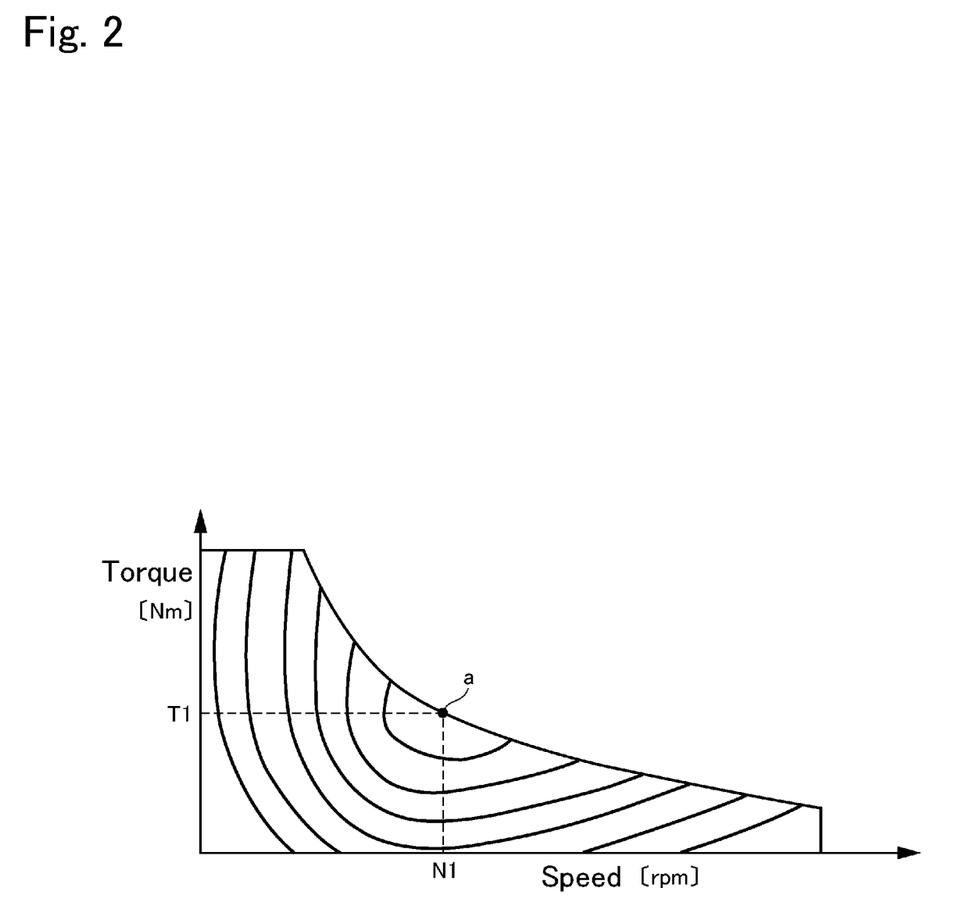
FIG. 2 shows a map determining a relation between an operating point of the motor and an energy efficiency.

An energy efficiency of the motor 1 varies depending on an output torque and a speed. For example, the energy efficiency of the motor 1 is optimized at an operating point "a" in a map shown in FIG. 2 at which a speed of the motor 1 is N1, and a torque of the motor 1 is T1. That is, the energy efficiency of the motor 1 is reduced with a deviation of the speed of the motor 1 from N1 or a deviation of the torque of the motor 1 from T1. Such characteristics of the motor 1 are stored in the ECU 8. Specifically, the energy efficiency of the motor 1 is calculated as an output power (i.e., a product of a speed and a torque) of the motor 1 with respect to an electric power supplied to the motor 1.

The transmission 4 comprises a plurality of gears, and a speed and a torque of each gear vary depending on the gear stage. Therefore, a magnitude of an inertia torque of each gear and a power loss at an engagement site between the gears are varied by shifting the gear stage of the transmission 4, and as a result, a power transmission efficiency of the transmission 4 will be changed.

For this reason, in principle, the gear stages of the transmission 4 are set in such a manner as to optimize a total energy efficiency of the system including an energy efficiency of the motor 1 and a power transmission efficiency of the transmission 4.

When shifting the gear stage of the transmission 4, a torque delivered from the motor 1 to the drive wheels 7 drops temporarily to change a behavior of the vehicle EV as a result of changing engagement state(s) of the engagement device(s). Such change in the behavior of the vehicle EV may be undesirable for a driver, and the driver may feel uncomfortable feeling. By contrast, if the gear stage of the transmission 4 is not shifted, such change in the behavior of the vehicle EV may be reduced, but the total energy efficiency of the vehicle EV may also be reduced thereby increasing electric consumption.

Figure 3:
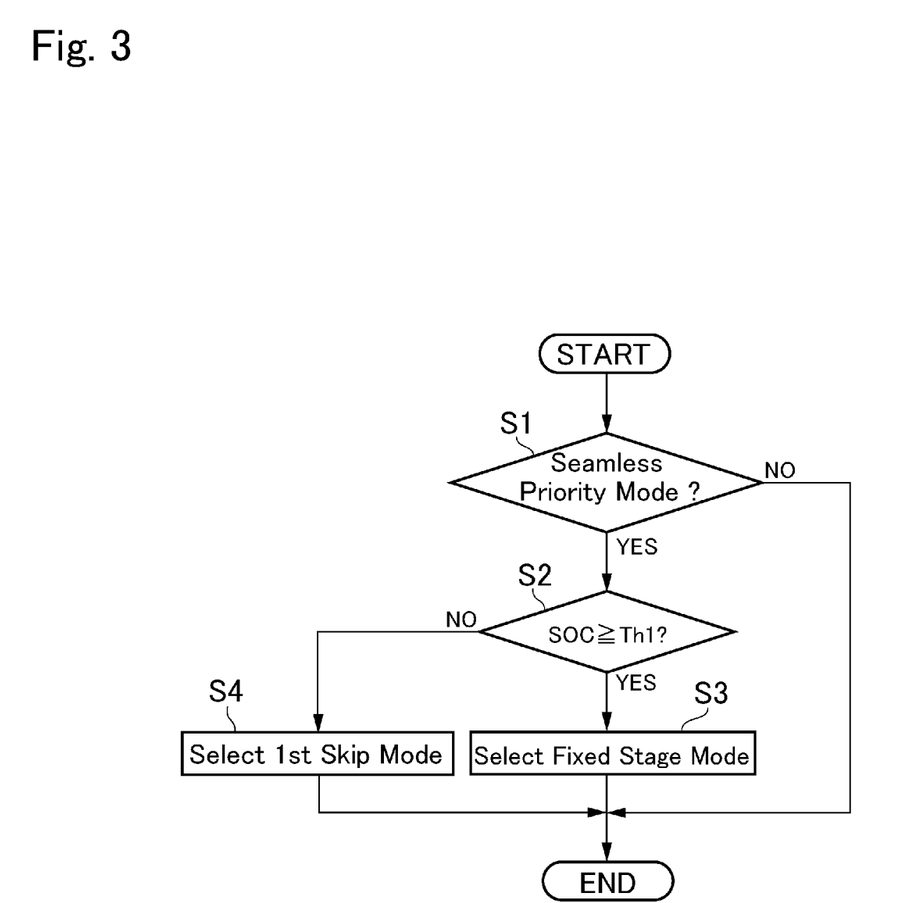
FIG. 3 is a flowchart showing one example of a routine executed by the speed change control system according to the embodiment of the present disclosure.

In order to prevent such disadvantage, according to the exemplary embodiment, the speed change control system is configured to switch a shifting mode between two modes to differentiate a frequency to execute a speed change operation or a way of determining an execution of a speed change operation, depending on an SOC level of the electric storage device 2. One example of a routine for switching the shifting mode is shown in FIG. 3. The routine shown in FIG. 3 is installed in the ECU 8, and the ECU 8 executes each step of the routine shown in FIG. 3 based on data transmitted to the ECU 8.

At step S1, it is determined whether a seamless priority mode is currently selected. The seamless priority mode is a generic term of an operating mode of the vehicle EV which is not tolerant of a change in vehicle behavior. For example, given that the operating mode can be selected from a plurality of modes in which a way of changing a drive torque and a way of executing a speed change operation are different, the seamless mode corresponds to a sporty mode in which a drive torque is changed quickly in response to an operation of the accelerator. Likewise, in a case that a passenger is carried by an autonomous vehicle that can be operated autonomously without manipulating an accelerator, a brake, a steering wheel manually, the passenger may not tolerant of a change in vehicle behavior. In this case, therefore, the seamless mode corresponds to an operating mode of the autonomous vehicle for carrying a passenger. In the autonomous vehicle, an existence of the passenger may be detected by a pressure sensor or the like.

If the seamless mode is not selected so that the answer of step S1 is NO, the routine returns. In this case, a normal shifting mode is selected. In the normal shifting mode, the gear stage of the transmission 4 is selected with reference to a shift map which is prepared in such a manner as to optimize a total energy efficiency of the vehicle EV. Specifically, the shift map determines upshift lines and downshift lines, and a shifting operation of the transmission 4 is executed when an operating point of the vehicle EV governed by a vehicle speed and a required drive force shifts across an upshift line or a downshift line.

Figure 4:
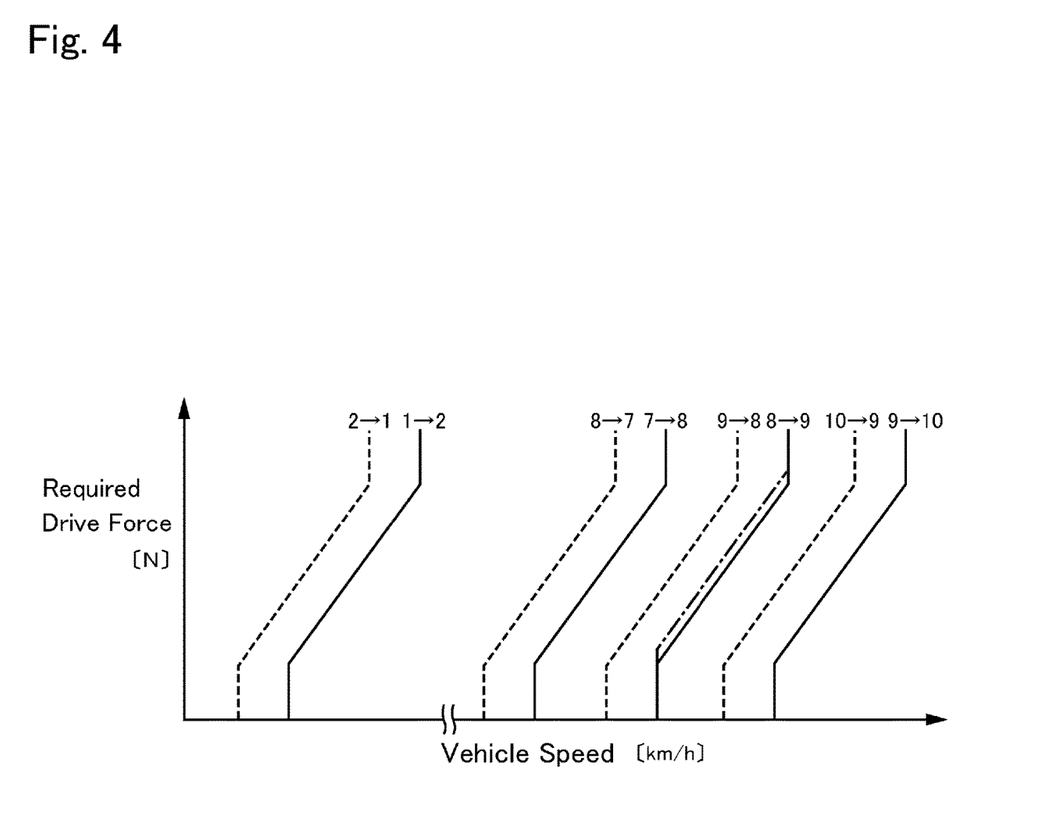
FIG. 4 shows one example of a shift map.

One example of the shift map is shown in FIG. 4. In the map shown in FIG. 4, the vertical axis represents a required drive force, and the horizontal axis represents a vehicle speed, each dashed curve is the downshift line, and each solid curve is the upshift line. For example, an upshifting of the transmission 4 is executed when the vehicle speed is increased so that the operating point is shifted across the upshift line from left to right in FIG. 4, or when the required drive force is reduced so that the operating point is shifted downwardly from the top in FIG. 4. As a result, the gear stage of the transmission 4 is shifted to the gear stage one stage higher than the current gear stage. By contrast, a downshifting of the transmission 4 is executed when the vehicle speed is reduced so that the operating point is shifted across the downshift line from right to left in FIG. 4, or when the required drive force is increased so that the operating point is shifted upwardly from the bottom in FIG. 4. As a result, the gear stage of the transmission 4 is shifted to the gear stage one stage lower than the current gear stage.

Otherwise, if the seamless mode is currently selected so that the answer of step S1 is YES, the routine progresses to step S2 to determine whether the SOC level of the electric storage device 2 is equal to or higher than a threshold level Th1. For example, the threshold level Th1 may be set to a lowest level of the electric storage device 2, an allowable limit level (higher than the lowest level) of the electric storage device 2 at which the electric storage device 2 can be prevented from being damaged, or a required level at which a required energy to travel from a current location to a destination can be ensured. Here, the SOC level of the electric storage device 2 can be obtained based e.g., on an output voltage of the electric storage device 2.

If the SOC level of the electric storage device 2 is equal to or higher than the threshold level Th1 so that the answer of step S2 is YES, the routine progresses to step S3 to select a fixed stage mode corresponding to a second mode of the exemplary embodiment, and thereafter returns. In the fixed stage mode, the gear stage of the transmission 4 is fixed to a predetermined stage. That is, a shifting operation of the transmission 4 is inhibited. According to the exemplary embodiment, specifically, the gear stage of the transmission 4 is fixed to the 1st forward stage in the fixed stage mode. In the fixed stage mode, a torque of the motor 1 is controlled in accordance with a required drive force.

By contrast, if the SOC level of the electric storage device 2 is lower than the threshold level Th1 so that the answer of step S2 is NO, the routine progresses to step S4 to select a first skip mode corresponding to a first mode of the exemplary embodiment, and thereafter returns. In the first skip mode, number of selectable gear stages is reduced compared to the normal shifting mode. According to the exemplary embodiment, specifically, only the odd forward stages such as the 1st stage, the 3rd stage, the 5th stage, the 7th stage, and the 9th stage are available in the first skip mode. In this case, even if the operating point is shifted across the upshift line or downshift line of the gear stage inhibited in the first skip mode, a shifting command will not be transmitted. Optionally, another shift map to be used in the first skip mode may be prepared.

The first skip mode is selected to suppress an increase in the electric consumption while suppressing a change in the behavior of the vehicle EV resulting from execution of a shifting operation. Nonetheless, it is difficult for the passenger to sense a change in the behavior of the vehicle EV resulting from execution of a shifting operation during propulsion at a high speed. Therefore, only the 2nd forward stage may also be inhibited in the first skip mode instead of inhibiting all of the even forward stages. That is, in the first skip mode, at least any one of the gear stages (or speed ratios) available in the normal shifting mode is inhibited.

In the first skip mode, a shifting operation may be executed in such a manner as to shift the gear stage to a target stage via the inhibited stage, and in this case, a variation width of a speed ratio is increased compared to the normal shifting mode. Consequently, a change in the behavior of the vehicle EV will be increased. In the first skip mode, therefore, an execution of a shifting operation may be made based on a value of a required drive force calculated by adding a predetermined value to a required drive force obtained based e.g., on a depression of the accelerator pedal, while with reference to the shift map for the normal shifting mode. For example, a determination to execute the shifting operation from the 8th forward stage to the 9th forward stage is made when a vehicle speed is increased across the dashed-dotted line shown in FIG. 4, or when a required drive force is reduced across the dashed-dotted line shown in FIG. 4. In other words, an execution of the shifting operation is made at an earlier timing compared to the normal shifting mode thereby reducing a change in the behavior of the vehicle EV.

Thus, in the case that the SOC level of the electric storage device 2 is equal to or higher than the threshold level Th1 in the seamless priority mode, a change in the behavior of the vehicle EV resulting from execution of the shifting operation may be reduced by selecting the fixed stage mode. By contrast, in the case that the SOC level of the electric storage device 2 is lower than the threshold level Th1 in the seamless priority mode, a frequency of executing the shifting operation may be reduced by selecting the first skip mode. In this case, an excessive reduction in the energy efficiency may also be prevented by not executing the shifting operation. According to the exemplary embodiment, therefore, the shifting operation can be executed while reducing a change in the behavior of the vehicle EV as well as preventing a reduction in the energy efficiency.

As described, it is difficult for the passenger to sense a change in the behavior of the vehicle EV resulting from execution of a shifting operation during propulsion at a high speed. Therefore, given that the vehicle EV is a sports car which can be propelled in a high speed range, the shifting operation may be allowed to be executed in the high speed range even if the SOC level of the electric storage device 2 is equal to or higher than the threshold level Th1.

Figure 5:
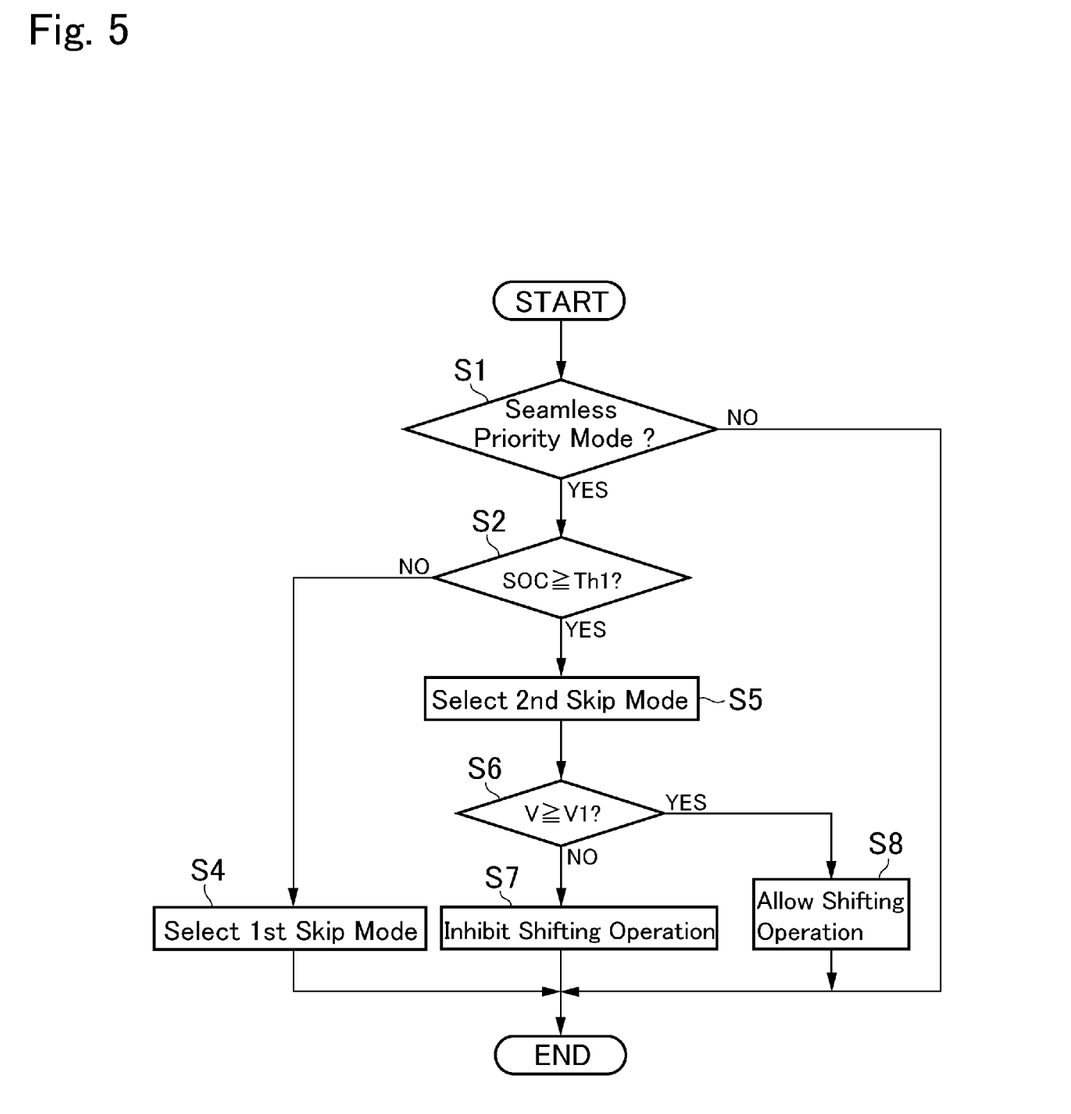
FIG. 5 is a flowchart showing one example of a routine to be executed by the speed change control system applied to a vehicle that can be driven at a high speed range.

For this purpose, the speed change control system according to the exemplary embodiment is further configured to execute the routine shown in FIG. 5. In FIG. 5, common step numbers are allotted to the steps in common with those of the routine shown in FIG. 3. In the routine shown in FIG. 5, if the SOC level of the electric storage device 2 is equal to or higher than the threshold level Th1 so that the answer of step S2 is YES, the routine progresses to step S5 to select a second skip mode also corresponding to the second mode of the exemplary embodiment. In the second skip mode, number of selectable gear stages (or speed ratios) is smaller than that in the first skip mode. Here, an availability of an execution of the shifting operation will be explained after step S6 for the sake of convenience.

Then, it is determined at step S6 whether a vehicle speed V is equal to or higher than a predetermined speed V1. For example, the predetermined speed V1 may be set to a level corresponding to an upper limit speed of a vehicle in which the upper limit speed is set to a relatively low speed. Instead, the predetermined speed V1 may also be set to a level at which it is difficult for the passenger to sense a change in the behavior of the vehicle EV resulting from execution of the shifting operation. Such speed level may be determined based on a result of an experiment.

If the vehicle speed V is lower than a predetermined speed V1 so that the answer of step S6 is NO, the routine progresses to step S7 to inhibit execution of the shifting operation, and thereafter returns. In this case, the gear stage is maintained to the stage as in the fixed stage mode (e.g., to the 1st forward stage). By contrast, if the vehicle speed V is equal to or higher than the predetermined speed V1 so that the answer of step S6 is YES, the routine progresses to step S8 to allow execution of the shifting operation, and thereafter returns. In this case, the gear stage of the transmission 4 is selected with reference to the shift map for the normal shifting mode. In this case, specifically, the gear stage is selected only from e.g., the 8th forward stage, the 9th forward stage, and the 10th forward stage available in the speed range higher than the predetermined speed V1. Thus, in the second skip mode, the gear stage is maintained to the 1st forward stage in the case that the vehicle speed V is lower than the predetermined speed V1, and the gear stage is selected from the 8th to 10th forward stages in the case that the vehicle speed V is equal to or higher than the predetermined speed V1.

That is, in the second skip mode, a change in the behavior of the vehicle EV is suppressed preferentially over the energy efficiency in a low speed range where the driver feels a change in the behavior of the vehicle EV easily. By contrast, in the high speed range where it is difficult for the driver to sense a change in the behavior of the vehicle EV or the behavior of the vehicle EV is not changes significantly by the shifting operation, a reduction in the energy efficiency is prevented preferentially. Thus, according to the exemplary embodiment, the shifting operation can be executed while reducing a change in the behavior of the vehicle EV as well as preventing a reduction in the energy efficiency.

According to the exemplary embodiment, in a case that an energy loss is increased in the seamless mode compared to the normal shifting mode, the shifting operation is allowed during deceleration of the vehicle EV upon satisfaction of a predetermined condition. Specifically, the operating point is adjusted to optimize the energy efficiency during deceleration of the vehicle EV upon satisfaction of a predetermined condition.

Figure 6:
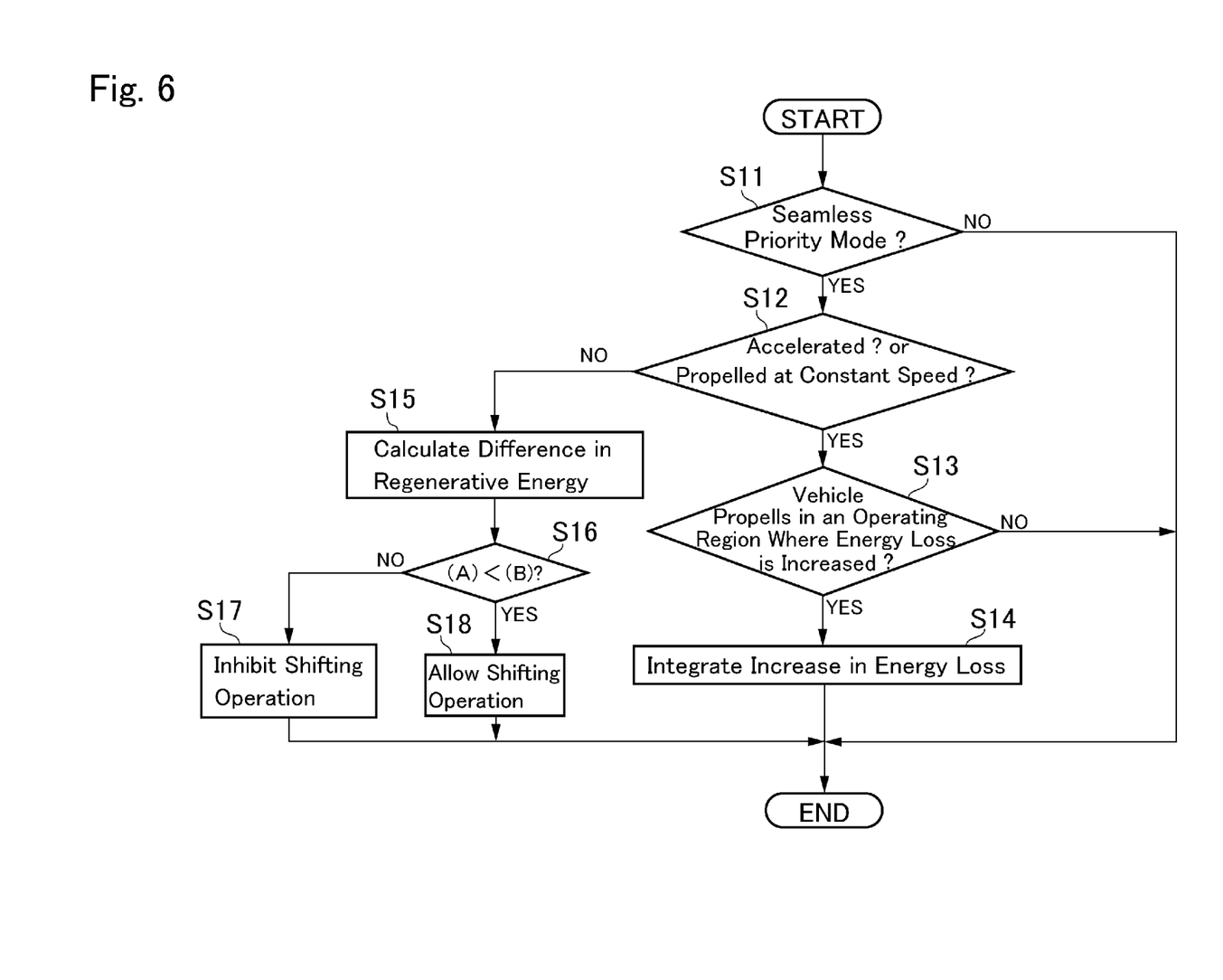
FIG. 6 is a flowchart showing a routine to be executed by the speed change control system during deceleration of the vehicle.

For this purpose, the speed change control system is further configured to execute the routine shown in FIG. 6. In the routine shown in FIG. 6, at step S11, it is determined whether the seamless priority mode is currently selected. Such determination at step S11 is similar to step S1 of the routines shown in FIGS. 3 and 5.

If the seamless mode is not selected so that the answer of step S11 is NO, the routine returns. In this case, the normal shifting mode is selected. By contrast, if the seamless mode is currently selected so that the answer of step S11 is YES, the routine progresses to step S12 to determine whether the vehicle EV is accelerated or propelled at a constant speed. That is, at step S12, it is determined whether a drive force to propel the vehicle EV is demanded. Therefore, for example, such determination at step S12 may be made based on a fact that the required drive force is greater than zero.

If the vehicle EV is accelerated or propelled at a constant speed so that the answer of step S12 is YES, the routine progresses to step S13 to determine whether the vehicle EV is propelled in an operating region where the energy loss is increased, as a result of selecting the fixed stage mode, the first skip mode, or the second skip mode. Specifically, the operating region of the vehicle EV is governed by the vehicle speed and the required drive force. For example, such determination at step S13 may be made based on whether the gear stage selected in the fixed stage mode, the first skip mode, or the second skip mode is different from the gear stage to be selected in the normal shifting mode. Instead, such determination at step S13 may be made based on whether a calculated operating point of the motor 1 in the fixed stage mode, the first skip mode, or the second skip mode is different from a calculated operating point of the motor 1 of a case in which the normal shifting mode is selected.

If the vehicle EV is not propelled in the operating region where the energy loss is increased so that the answer of step S13 is NO, the routine returns. By contrast, if the vehicle EV is propelled in the operating region where the energy loss is increased so that the answer of step S13 is YES, the routine progresses to step S14 to calculate an amount of increase in the energy loss, and thereafter returns. Specifically, an energy efficiency in the fixed stage mode, the first skip mode, or the second skip mode is subtracted from an energy efficiency of a case in which the normal shifting mode is selected. Then, an amount of increase (A) in the energy loss is calculated by time-integrating the calculated difference of the energy efficiency. The amount of increase (A) in the energy loss thus calculated is stored in the ECU 8.

Otherwise, if the vehicle EV is decelerated so that the answer of step S12 is NO, the routine progresses to step S15 to calculate a difference (B) in a regenerative energy. At step S15, specifically, an amount of regenerative energy of a case in which the vehicle EV is stopped only by a braking torque generated by the motor 1 while maintaining the current gear stage is calculated taking account of a regeneration efficiency of the motor 1. Likewise, an amount of regenerative energy of a case in which the vehicle EV is stopped only by a braking torque generated by the motor 1 while shifting the gear stage in such a manner as to optimize the energy efficiency is calculated taking account of a regeneration efficiency of the motor 1. Then, a difference (B) between those amounts of the regenerative energies is calculated. That is, at step S15, an increasing amount of energy possible to be regenerated is calculated based on the difference between the regeneration efficiency of the case in which the shifting operation is executed and the regeneration efficiency of the case in which the shifting operation is not executed. However, if the normal shifting mode is selected before starting to decelerate the vehicle EV, deceleration of the vehicle EV may be started in the gear stage which cannot be selected in the fixed stage mode, the first skip mode, or the second skip mode. In this case, therefore, the aforementioned current gear stage is not limited to the gear stages selectable in the fixed stage mode, the first skip mode, or the second skip mode.

Then, it is determined at step S16 whether the difference (B) in the regenerative energy is greater than the amount of increase (A) in the energy loss calculated at step S14. If the difference (B) in the regenerative energy is smaller than the amount of increase (A) in the energy loss so that the answer of step S16 is NO, the routine progresses to step S17 to inhibit the shifting operation, and thereafter returns. For example, if the 3rd forward stage is selected when starting to decelerate the vehicle EV, the vehicle EV is decelerated while maintaining the 3rd forward stage.

By contrast, if the difference (B) in the regenerative energy is greater than the amount of increase (A) in the energy loss so that the answer of step S16 is YES, the routine progresses to step S18 to allow execution of the shifting operation, and thereafter returns. At step S18, specifically, an amount of the regenerative energy is increased by driving the motor 1 at the operation point of high efficiency. To this end, the shifting operation is executed in accordance with the vehicle speed etc. among the gear stages including the stages not available in the first skip mode and so on. That is, if the answer of step S16 is YES, the shifting operation is executed as in the normal shifting mode.

Thus, according to the exemplary embodiment, availability of execution of the shifting operation during deceleration of the vehicle EV is determined based on the amount of increase (A) in the energy loss resulting from selecting the fixed stage mode, the first skip mode, or the second skip mode. According to the exemplary embodiment, therefore, the motor 1 is allowed to be driven at the operating point of high efficiency in an appropriate condition. For this reason, a variation width in the SOC level of the electric storage device 2 can be reduced to limit damage on the electric storage device 2. In addition, the shifting operation is inhibited in the case that the difference (B) in the regenerative energy is smaller than the amount of increase (A) in the energy loss. In this case, a change in the behavior of the vehicle EV resulting from execution of the shifting operation can be suppressed. By thus carrying out the routine shown in FIG. 6, therefore, the vehicle EV can be propelled seamlessly while reducing the electric consumption.

Figure 7:
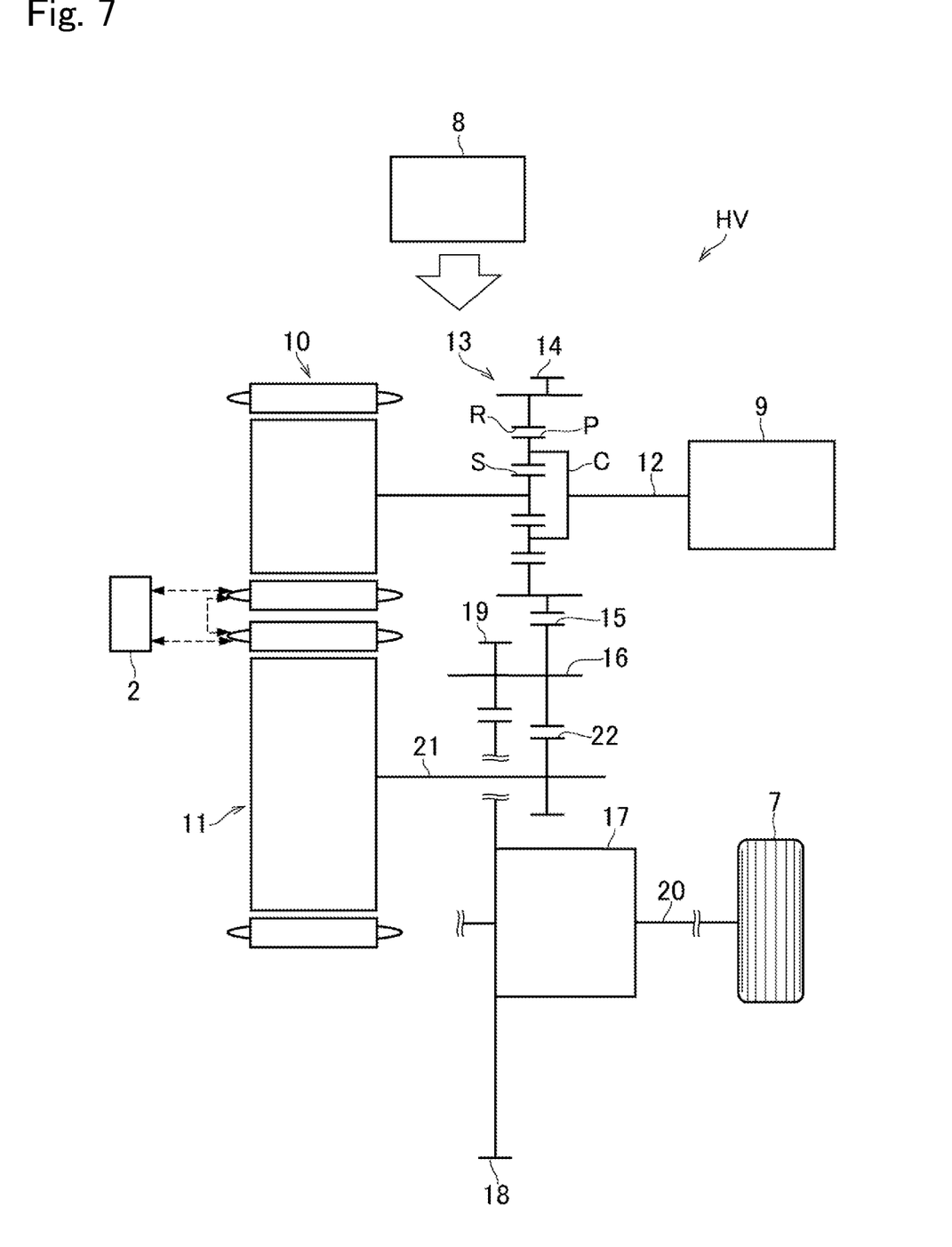
FIG. 7 is a schematic illustration showing another example of a structure of the vehicle to which the speed change control system according to the embodiment of the present disclosure is applied.

The speed change control system according to the exemplary embodiment may also be applied to a series-parallel hybrid vehicle shown in FIG. 7. In the vehicle HV shown in FIG. 7, a prime mover comprises an engine 9, a control motor 10, and a drive motor 11. A same kind of motor as the motor 1 may be employed as the control motor 10 and the drive motor 11 respectively.

A power split mechanism 13 is connected to an output shaft 12 of the engine 9 so that an output torque of the engine 9 is distributed to the control motor 10 and the drive wheels 7. In the example shown in FIG. 7, a single-pinion planetary gear unit adapted to perform a differential action is employed as the power split mechanism 13. Specifically, the power split mechanism 13 comprises a sun gear S, a ring gear R as an internal gear that is arranged concentrically with the sun gear S, a plurality of planetary gears P interposed between the sun gear S and the ring gear R, and a carrier C supporting the planetary gears P in a rotatable manner. Instead, a double-pinion planetary gear unit and a Ravigneaux planetary gear unit may also be employed as the power split mechanism 13. In addition, a complex planetary gear unit that can alter a torque split ratio to the control motor 10 and the drive wheels 7 by selectively connecting a plurality of planetary gear units through a clutch or the like may also be employed as the power split mechanism 13.

The control motor 10 is connected to the sun gear S, and the engine 9 is connected to the carrier C. When transmitting an output torque of the engine 9 to the ring gear R, the control motor 10 generates a reaction torque. That is, in the power split mechanism 13, the carrier C serves as an input element, the sun gear S serves as a reaction element, and the ring gear R serves as an output element. The engine 9 may be connected to the carrier C not only directly but also indirectly through a gear unit or a torque converter for varying the torque of the engine 9, or a damper mechanism for damping pulsation of the torque of the engine 9.

An output gear 14 is formed on an outer circumferential face of the ring gear R. A driven gear 15 is fitted onto one end of a countershaft 16 extending parallel to the output shaft 12 of the engine 9 to be meshed with the output gear 14, and a drive gear 19 is fitted onto the other end of the countershaft 16 to be meshed with a ring gear 18 of a differential gear unit 17. The drive gear 19 is diametrically smaller than the ring gear 18 so that torque of the drive gear 19 is delivered to the differential gear unit 17 while being multiplied. The torque delivered to differential gear unit 17 is distributed to the pair of drive wheels 7 through each driveshaft 20.

The drive motor 11 corresponding to the "motor" of the exemplary embodiment is connected to the driven gear 15. Specifically, the drive motor 11 is arranged in such a manner that an output shaft (or a rotor shaft) 21 of the drive motor 11 extends parallel to the output shaft 12 of the engine 9 and the countershaft 16, and an output gear 22 that is diametrically smaller than the driven gear 15 is fitted onto an end potion of the output shaft 21 to be meshed with the driven gear 15. That is, an output torque of the drive motor 11 is transmitted to the driven gear 15 while being multiplied.

The control motor 10 and the drive motor 11 are individually connected to the electric storage device 2 including the battery and the capacitor so that electricity generated by the control motor 10 or the drive motor 11 is accumulated in the electric storage device 2, and the electricity is supplied to the control motor 10 and the drive motor 11 respectively. In addition, the electricity generated by one of the control motor 10 and the drive motor 11 may be supplied to other one of the control motor 10 and the drive motor 11.

In order to control the engine 9, the control motor 10, the drive motor 11 and so on, the vehicle HV shown in FIG. 7 is also provided with the ECU 8. As described, the ECU 8 is configured having a microcomputer as its main constituent, and detection signals from various sensors are sent to the ECU 8. The ECU 8 determines target speeds and target torques of the engine 9, the control motor 10, and the drive motor 11 based on the incident signals and formulas as well as maps installed in the ECU 8, and transmits command signals to the engine 9, the control motor 10, and the drive motor 11 to achieve the target speeds and the target torques. For example, the ECU 8 receives detection signals of a vehicle speed, a speed of the output shaft 12 of the engine 9 (or the carrier C), speeds of the control motor 10 and the drive motor 11, a depression of the accelerator pedal (not shown), a depression of the brake pedal (not shown), an SOC level of the electric storage device 2, a temperature of the electric storage device 2, temperatures of the control motor 10 and the drive motor 11 and so on.

An operating mode of the vehicle HV can be selected from a hybrid mode (to be abbreviated as the "HV mode" hereinafter) and an electric vehicle mode (to be abbreviated as the "EV mode" hereinafter). In the HV mode, the vehicle HV is propelled by generating a drive torque by the engine 9 while generating a drive torque by the drive motor 11 (or the control motor 10) according to need. During propulsion in the HV mode, a required drive power is calculated based e.g., on a depression of the accelerator pedal, and then, a target engine speed is calculated in accordance with the required drive power. As described, the power split mechanism 13 is adapted to transmit a torque of engine 9 to the ring gear R by establishing a reaction torque by the control motor 10. That is, a speed of the engine 9 may be controlled arbitrarily by controlling a speed of the control motor 10. For this purpose, a target speed of the control motor 10 is determined in accordance with the target engine speed thus calculated. Since a speed of the control motor 10 may be controlled continuously, a speed of the engine 9 may also be controlled continuously. That is, the power split mechanism 13 may serve as a continuously variable transmission, and accordingly, the power split mechanism 13 corresponds to the "transmission" of the exemplary embodiment.

When controlling a speed of the control motor 10 in such a manner as to adjust a speed of the engine 9 to the target speed while establishing a reaction torque by the control motor 10 to transmit a torque of the engine 9 to the ring gear R, the control motor 10 serves as a motor or a generator in accordance with a vehicle speed and a target engine speed. Specifically, in a case that the control motor 10 establishes the reaction torque in a direction to increase the speed of the control motor 10, the control motor 10 serves as a motor. By contrast, in a case that the control motor 10 establishes the reaction torque in a direction to reduce the speed of the control motor 10, the control motor 10 serves as a generator.

In the case that the control motor 10 serves as a motor, an output power of the control motor 10 is added to an output power of the engine 9, and delivered to the ring gear R. By contrast, in the case that the control motor 10 serves as a generator, an output power of the engine 9 is partially translated into an electric power by the control motor 10. That is, the output power of the engine 9 is reduced to be delivered to the ring gear R.

A torque of the drive motor 11 is controlled in accordance with a difference between a required drive force (or drive torque) to propel the vehicle HV calculated based e.g., on a depression of the accelerator pedal and the torque delivered to the ring gear R. For example, in a case that the required drive torque to propel the vehicle HV cannot be achieved by the torque delivered to the ring gear R, the drive motor 11 is operated as a motor to apply a torque to the driven gear 15. By contrast, in a case that the torque delivered to the ring gear R is greater than the required drive torque to propel the vehicle HV, the drive motor 11 is operated as a generator to reduce the torque at the driven gear 15. That is, the drive motor 11 serves as an assist motor.

In a case of changing a speed ratio of the power split mechanism 13 while maintaining an output power of the engine 9 to a constant power, a speed of the engine 9 is changed thereby changing an output torque of the engine 9. As a result, an output torque of the power split mechanism 13 is changed. In this case, therefore, an output torque of the drive motor 11 is changed in accordance with the output torque of the power split mechanism 13. Specifically, the torque of the drive motor 11 is changed by changing the speed ratio of the power split mechanism 13.

In the EV mode, the vehicle HV is propelled by generating a drive torque only by the drive motor 11, and it is not necessary to generate a drive torque by the engine 9 and the control motor 10. In this situation, a friction torque of the engine 9 is increased greater than an inertia torque and a cogging torque of the control motor 10, therefore, the engine 9 is stopped and the control motor 10 is idled. In the EV mode, if it is necessary to drive the engine 9 to e.g., warm up the engine 9, the control motor 10 may be idled without supplying electricity to the control motor 10 while driving the engine 9.

In the HV mode, a total energy efficiency of the vehicle HV is changed depending on an energy efficiency in accordance with an operating point of the engine 9, an energy efficiency of the control motor 10, an energy efficiency of the drive motor 11, and a power transmission efficiency in accordance with speeds and torques of the gears. Therefore, in principle, torques and speeds of the engine 9, the control motor 10, and the drive motor 11 are controlled in such a manner as to optimize the total energy efficiency of the vehicle HV.

However, although the power split mechanism 13 serves as a continuously variable transmission, if a required drive force is changed significantly and consequently a speed ratio of the power split mechanism 13 is changed abruptly, behavior of the vehicle HV would be changed by an abrupt change in a speed of the engine 9. Such change in the behavior of the vehicle HV may be undesirable for a driver, and the driver may feel uncomfortable feeling. In this situation, if the speed ratio of the power split mechanism 13 is not changed, the change in the behavior of the vehicle HV may be suppressed, but the total energy efficiency of the vehicle HV is reduced. Consequently, fuel consumption and electric consumption will be increased.

In order to avoid such disadvantages, in the vehicle HV, it is also preferable to determine whether to execute a speed change operation of the power split mechanism 13 in accordance with an SOC level of the electric storage device 2. For this purpose, the fixed stage mode, the first skip mode, and the second skip mode of the routines shown in FIGS. 3 and 5 may modified as explained below.

Specifically, the fixed stage mode may be modified into a fixed ratio mode in which a speed ratio of the power split mechanism 13 is maintained to a predetermined ratio. In this case, in order to prevent a reduction in a speed of the engine 9 to a stall speed in the low speed range, it is preferable to fix the speed ratio of the power split mechanism 13 to a ratio comparable to the speed ratio in the 1st forward stage of the geared transmission 4 shown in FIG. 1.

In the vehicle HV shown in FIG. 7, a required drive force is achieved by reducing a torque of the engine 9 while increasing a torque of the drive motor 11, or by increasing a torque of the engine 9 while reducing a torque of the drive motor 11. In the fixed ratio mode, therefore, a reduction in the total energy efficiency of the vehicle HV may be avoided by controlling the torques of the engine 9 and the drive motor 11.

A change in the behavior of the vehicle HV resulting from an execution of a speed change operation of the power split mechanism 13 as a continuously variable transmission is smaller than that of a vehicle having a geared transmission, and a frequency of such change in the behavior of the vehicle HV is lower than that in the vehicle having the geared transmission. Therefore, the first skip mode may be replaced by the normal shifting mode in which a speed change operation is executed in such a manner as to optimize a system efficiency. Specifically, in the case of applying the speed change control system according to the exemplary embodiment to the vehicle HV shown in FIG. 7, the speed change control system selects the fixed ratio mode if the SOC level of the electric storage device 2 is equal to or higher than the threshold level Th1. Consequently, a reduction in the energy efficiency in the vehicle HV can be avoided, and a change in the behavior of the vehicle HV can be reduced.

The second skip mode may be replaced by a mode in which the speed ratio is fixed to the speed ratio in the fixed ratio mode if the SOC level of the electric storage device 2 is lower than the threshold level Th1, and the speed ratio is controlled in such a manner as to optimize the system efficiency in accordance with a required drive force and a vehicle speed if the SOC level of the electric storage device 2 is equal to or higher than the threshold level Th1. In the case that the SOC level of the electric storage device 2 is equal to or higher than the threshold level Th1, the speed ratio may be changed not only stepwise but also continuously.

During deceleration of the vehicle HV, an engine braking torque is established in accordance with a pumping loss and a friction torque of the engine 9 by stopping fuel supply to the engine 9, and the control motor 10 establishes a reaction torque to deliver the engine braking torque to the drive wheels 7. In addition, the drive motor 11 is operated as a generator to apply a braking torque to the drive wheels 7 depending on the speed of the engine 9. Since a speed of the drive motor 11 during deceleration is changed depending on a vehicle speed, a generating efficiency (i.e., the energy efficiency) is governed by the regenerative torque of the drive motor 11. During deceleration of the vehicle HV, a ratio between the engine braking torque and the braking torque of the drive motor 11 may be altered by controlling a speed ratio of the power split mechanism 13.

Accordingly, in the case that the answer of step S16 is YES during deceleration of the vehicle HV so that an execution of the speed change operation is allowed, a speed ratio of the power split mechanism 13 is controlled in such a manner that the drive motor 11 generates a braking torque which can optimize the generating efficiency of the drive motor 11. Specifically, the operating point of the drive motor 11 is shifted by controlling the speed ratio of the power split mechanism 13 to alter a required torque of the drive motor 11. In this situation, the current speed ratio may not be greater than the ratio which can optimize the generating efficiency of the drive motor 11. That is, in the case that the speed change operation is allowed at step S18, the speed change operation is not limited to an upshifting for reducing the speed ratio.

As described, the speed change control system according to the exemplary embodiment may be applied not only to the vehicle in which the transmission is arranged between the motor and the drive wheels, but also to the vehicle in which the transmission is arranged between the engine and the drive wheel and the motor is connected to the output shaft of the transmission. The transmission may be not only the geared transmission that changes a speed ratio stepwise, but also the continuously variable transmission that changes a speed ratio continuously. Therefore, the speed change control system according to the exemplary embodiment may be applied to a vehicle in which both of the engine and the motor are arranged on the input side of the transmission, and to a series-hybrid vehicle in which the engine is connected to the generator and the motor driven by the electricity supplied from the generator is connected to the transmission. Further, the speed change control system according to the exemplary embodiment may also be applied to a vehicle in which another motor serving as a prime mover is connected to the output shaft of the transmission arranged between the motor and the drive wheels, and to an in-wheel motor vehicle in which a motor as a prime mover and a transmission are arranged respectively in each wheel.

Furthermore, the speed change control system according to the exemplary embodiment may also be applied to a vehicle in which the seamless priority mode is not available. In this case, the fixed stage mode (or the fixed ratio mode) and the second skip mode will be selected in the case that the SOC level of the electric storage device 2 is equal to or higher than the threshold level Th1, and the normal shifting mode will be selected in the case that the SOC level of the electric storage device 2 is lower than the threshold level Th1.

What is claimed is:
1. A speed change control system for a vehicle, comprising:
   a transmission;
   a drive wheel that is connected to the transmission;
   a motor in which at least any one of a torque and a speed is changed by changing a speed ratio of the transmission; and
   an electric storage device that is connected to the motor,
   wherein the speed change control system comprises a controller that controls the transmission, and
   wherein the controller is configured to:
      select a shifting mode of the transmission from a first mode in which a speed ratio of the transmission is changed in accordance with an operating condition of the vehicle, and a second mode in which the speed ratio of the transmission is fixed to a predetermined ratio,
      select the first mode in a case that a state of charge level of the electric storage device is lower than a predetermined level, and select the second mode in a case that the state of charge level of the electric storage device is equal to or higher than the predetermined level,
      select the shifting mode of the transmission from a normal shifting mode in which the speed ratio of the transmission is controlled in accordance with a vehicle speed and a required drive force in such a manner that a system efficiency is optimized, and a seamless mode in which the speed ratio of the transmission is controlled in such a manner that a change in a behavior of the vehicle is reduced, wherein the seamless mode includes the first mode and the second mode, and the first mode includes a mode in which at least any one of the speed ratios available in the normal shifting mode is inhibited, calculate an increasing amount of an energy loss resulting from propelling the vehicle in the seamless mode, calculate a difference between an amount of regenerative energy by the motor in a case of maintaining the current speed ratio during deceleration of the vehicle, amount of regenerative energy by the motor in a case of changing the speed ratio of the transmission to increase the regenerative energy, allow execution of a speed change operation of the transmission during deceleration of the vehicle in a case that the difference between the regenerative energies is greater than the increasing amount of the energy loss, and inhibit execution of a speed change operation of the transmission during deceleration of the vehicle in a case that the difference between the regenerative energies is smaller than the increasing amount of the energy loss.

2. The speed change control system for the vehicle as claimed in claim 1, wherein the second mode includes a mode in which the speed ratio of the transmission is fixed to the predetermined ratio in a case that a speed of the vehicle is lower than a predetermined level, and the speed ratio of the transmission is changed in a case that the speed of the vehicle is equal to or higher than the predetermined level.

3. The speed change control system for the vehicle as claimed in claim 1, wherein the controller is further configured to set the speed ratio of the transmission to the ratio same as the normal shifting mode during deceleration of the vehicle, in the case that execution of a speed change operation of the transmission is allowed during deceleration of the vehicle.

4. The speed change control system for the vehicle as claimed in claim 1, wherein the motor is connected to an input side of the transmission.

5. The speed change control system for the vehicle as claimed in claim 1, further comprising:

another prime mover that is connected to an input side of the transmission, wherein the motor is connected to a torque transmitting route between the transmission and the drive wheel.

* * * * *